United States Patent [19]

Takemura

[11] 4,237,488
[45] Dec. 2, 1980

[54] BLEMISH COMPENSATING SYSTEM FOR A SOLID STATE IMAGE PICK-UP DEVICE

[75] Inventor: Yasuo Takemura, Kawasaki, Japan

[73] Assignee: Tokyo Shibaura Denki Kabushiki Kaisha, Kawasaki, Japan

[21] Appl. No.: 1,836

[22] Filed: Jan. 8, 1979

[30] Foreign Application Priority Data

Jan. 20, 1978 [JP] Japan .................................. 53-4284

[51] Int. Cl.$^3$ ............................................. H04N 5/34
[52] U.S. Cl. .................................... 358/163; 358/213
[58] Field of Search ................. 358/163, 167, 213, 221

[56] References Cited

U.S. PATENT DOCUMENTS

| 2,996,576 | 8/1961 | Dolby . | |
|---|---|---|---|
| 3,869,567 | 3/1975 | Covington | 358/163 |
| 3,949,162 | 4/1976 | Malueg | 358/213 |

OTHER PUBLICATIONS

LeCouteur, BBC Research Department "The Electronic Concealment of Blemishes on the Output of Solid State Sensors", Aug. 1977.

*Primary Examiner*—Richard Murray

*Attorney, Agent, or Firm*—Oblon, Fisher, Spivak, McClelland & Maier

[57] ABSTRACT

There is provided a blemish compensating system used for a solid state image pick-up device having a plurality of image pick-up elements which are arranged to store electric charges corresponding to an optical image formed on the light sensitive portions thereof and are sequentially energized by a driving circuit to derive out the electric charges stored on the respective image pick up elements. The blemish compensating system includes a memory which stores address data representing the position of a blemish image pick-up element and produces an output signal when the address of the memory storing the address data for the blemish image pick-up element is specified by a signal in synchronism with the output of the driver circuit, a delay circuit for delaying the output signal of the solid state image pick-up device by a time required for one horizontal scanning, and a switch circuit in which, when it is at a first switching position, it permits the output signal of the solid state image pick-up device to pass therethrough, and in which, in response to the output signal from the memory circuit, it is set to a second switching position so that it permits the output signal from the solid state image pick-up device by way of the delay circuit to pass therethrough.

7 Claims, 6 Drawing Figures

BLEMISH COMPENSATING SYSTEM FOR A SOLID STATE IMAGE PICK-UP DEVICE

The present invention relates to a blemish compensating system for a solid state image pick-up device.

Recently, a color television camera using solid state image pick-up devices has actively been researched and developed. The solid state image pick-up device is categorized into two, one using integrated MOS field effect transistors and the other including charge transfer elements such as CCD (charge coupled device) or BBD (bucket brigade device). Usually, a color television camera is constructed by using a plurality of these devices.

A color television system currently used in Japan and USA needs $512 \times 320 = 163,840$ or more of effective picture elements. However, it is very difficult to manufacture the solid state image pick-up device with such a number of picture elements which is operable in a perfect performance. Because of non-uniformity of the semiconductor substrate or dust attached in the manufacturing process, defects take place somewhere in the solid state image pick-up device. These in turn appear on the screen of a receiver. Particularly in the case of a color television, when a red signal generating part is blemished, a red blemish appears on the screen without a red signal. For example, a red spot will appear on a blue sky. In the case of such a blemish, even if it is a small spot, it is an eyesore. Accordingly, in the case of a large blemish or a number of blemishes, the picture on the screen is unseemly. In the manufacturing process of the solid state image pick-up, care is fully taken so that no blemish takes place. The manufacturing technology at the present stage hardly manufactures a perfect solid state image pick-up device with an effective manufacturing method. For this, in the practical use, the solid state image pick-up devices with relatively small blemishes are selected from the manufactured ones and used as good ones. The selection takes a long time with poor yeild. This makes the cost of CCD extremely high and prevents the prevalence of color television cameras with CCD.

Accordingly, an object of the invention is to provide a blemish compensating system for a solid state image pick-up device for minimizing an adverse effect of solid state image pick-up elements with blemishes on a picture.

According to one aspect of the invention, there is provided a blemish compensating system for a solid state image pick-up device having a plurality of image pick-up elements which are arranged to store electric charges corresponding to an optical image formed on the light sensitive portions thereof and are sequentially energized by a driving circuit in response to an output signal from a control signal generating means to derive out the electric charges stored on the respective image pick-up elements, comprising:

memory means for storing address data representing the position of a defective solid state image pick-up element or elements;

delay means for delaying an output signal from said solid state image pick-up device;

comparing means for comparing the address data corresponding to the position of that image pick-up element which is energized by said driving circuit to produce an output signal with the address data read out from said memory means, in which, when both the data are coincident with each other as a result of the comparison, said comparing means produces a next address specifying signal; and switching means permitting the output signal of the solid state image pick-up device to pass therethrough in a first switching position, and responding to the output signal from said comparing means to be set to second switching position, thereby permitting the output signal from the solid state image pick-up device to pass therethrough by way of said delay means.

Other objects and features of the invention will be apparent from the following description taken in connection with the accompanying drawings, in which:

FIG. 1 shows a block diagram of a part of a blemish compensating system which is an embodiment of the invention;

FIG. 2 schematically illustrates positions of defective image pick-up elements of an image pick-up device used in the circuit shown FIG. 1;

Figure 1:
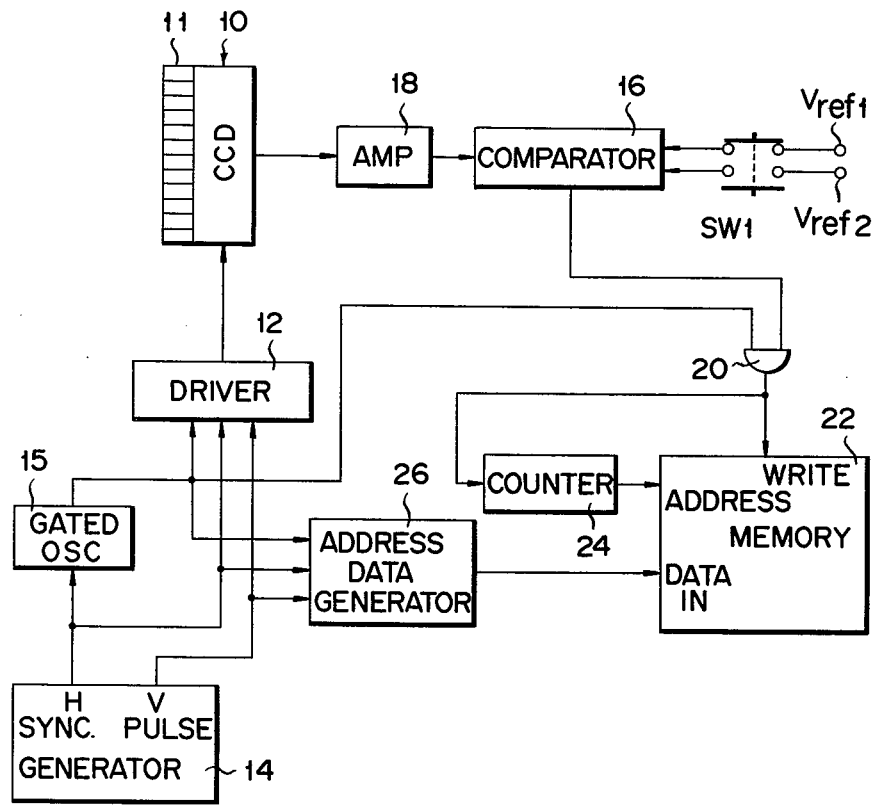

An embodiment of a blemish compensating system for a solid state image pick-up device will be described referring to the drawings.

FIG. 1 illustrates part of a blemish compensating system for a solid state image pick-up device used in a color television camera, which is an embodiment according to the invention. In FIG. 1, a solid state image pick-up device 10 has a plurality of image pick-up elements of which the light sensitive faces are covered with a color stripe filter 11. In the image pick-up device 10, a driver circuit 12 responds to vertical and horizontal synchronizing pulses generated from vertical and horizontal synchronization pulse generator 14 and a horizontal position pulse generated by a gated oscillator which is gate-controlled by the horizontal synchronization pulse and produces an output signal. The drive circuit 12 successively energizes the image pick-up elements which in turn produce electric signals corresponding to an optical image received by the light receiving side. The image pick-up tube 10 produces an output signal which in turn is coupled in transmitting relation with one of the input terminals of a comparator 16, through an amplifier 18. Reference power source terminals Vref1 and Vref2 are selectively applied to the other input terminal of the comparator 16, via a switch SW1. The output terminal of the comparator 16 is coupled with one input terminal of an AND gate 20 receiving at the other input terminal a horizontal synchronizing pulse from the synchronization generator 14. The output terminal of the AND gate 20 is connected to the write terminal of a memory 22 and to the input terminal of a counter 24. In response to the trailing edge of an input pulse, the counter 24 is incremented and the output signal of the counter 24 is applied to an addressing terminal of the memory 22. To the data input terminal of the memory 22 is connected the output terminal of an address data generator 26 which produces address data corresponding to the position of the image pick-up element energized by the drive circuit 12, in response to the vertical and horizontal synchronizing pulses from the synchronizing pulse generator 14.

Figure 2:
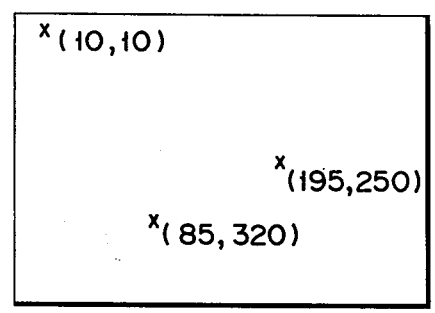

The operation of the circuit shown in FIG. 1 will be described. Assume now that the image pick-up device 10 is comprised of two-dimensional CCD having picture elements, 512 for vertical and 320 for horizontal, and that the picture elements having blemishes are located at positions (10,10), (195,250) and (85,320), as shown in FIG. 2. The blemishes include a white blemish which appears as a white spot on the television screen and a black blemish as a black spot. The white blemish is detected by detecting that the output signal from the CCD 10 is larger than the reference signal Vref1 when the light sensitive surface of the CCD 10 is uniformly illuminated. The black blemish is detected when the former is smaller than the latter. Let us consider a case where the CCD 10 has a white blemish at the position (10,10), black blemishes at the positions (195,250) and (85,320), the switch SW1 is set to the reference power source terminal Vref1 and the light receiving surface of the CCD 10 illuminated by light with a given level. The image pick-up elements are successively energized by the driver circuit 12. At this time, the output signal produced by all the image pick-up elements disposed preceding to the element at the position (10,10) are at a lower level than the level of the reference signal Vref1. The comparator 16 does not produce an output signal and thus no write-in instruction signal is applied to the memory 2. Then, the output of the driver circuit 10 energizes the image pick-up element at (10,10) so that the CCD 10 produces a signal with a higher level than the reference signal Vref1 level, and the comparator 16 produces an output signal which in turn enables the AND gate 20. Upon this, the horizontal synchronizing pulse from the synchronizing pulse generator 14 is applied to the write-in terminal of the memory 22. At this time, the data input terminal of the memory 22 has been supplied with the blemish position information corresponding to the position (10,10) of CCD 10. The blemish position information is written into the memory. In response to the trailing edge of the output pulse from the AND gate 20, the counter 24 is counted up by one count and specifies the address location of the memory 22 into which the next blemish position information is written. In this example, no white blemish other than this exists so that no other blemish information is loaded into the memory 22.

In detecting the black blemish, the switch SW1 is first turned to the reference power source terminal Vref2 and the comparator 16 is so set as to produce an output signal when the output signal from the amplifier 18 is lower than the reference signal Vref2. As in the white blemish detection, the image pick-up elements are successively energized. Through the successive energization, the image pick-up element located at the position (195,250) is energized. At this time, the output signal delivered through the amplifier 18 from the CCD 10 exhibits a lower level than that of the reference signal Vref2 so that the comparator 16 produces an output signal which in turn enables the AND gate 20. As a result, the horizontal synchronizing pulse from the pulse generator 14 is applied to the write-in terminal of the memory through the AND gate 20 so that address data from the address data generator 26 corresponding to the position (195,250) of CCD 10 is written into the memory 22. Then, the image pick-up elements are successively energized and the image pick-up element at the location (85,320) is energized. At this time, the address data corresponding to the position (85,320) is loaded into the memory 22, as in the previous case.

In this manner, the blemish position information at the positions (10,10), (195,250) and (85,320) including black and white blemishes are stored at the address 1, 2 and 3 of the memory 22.

Figure 3:
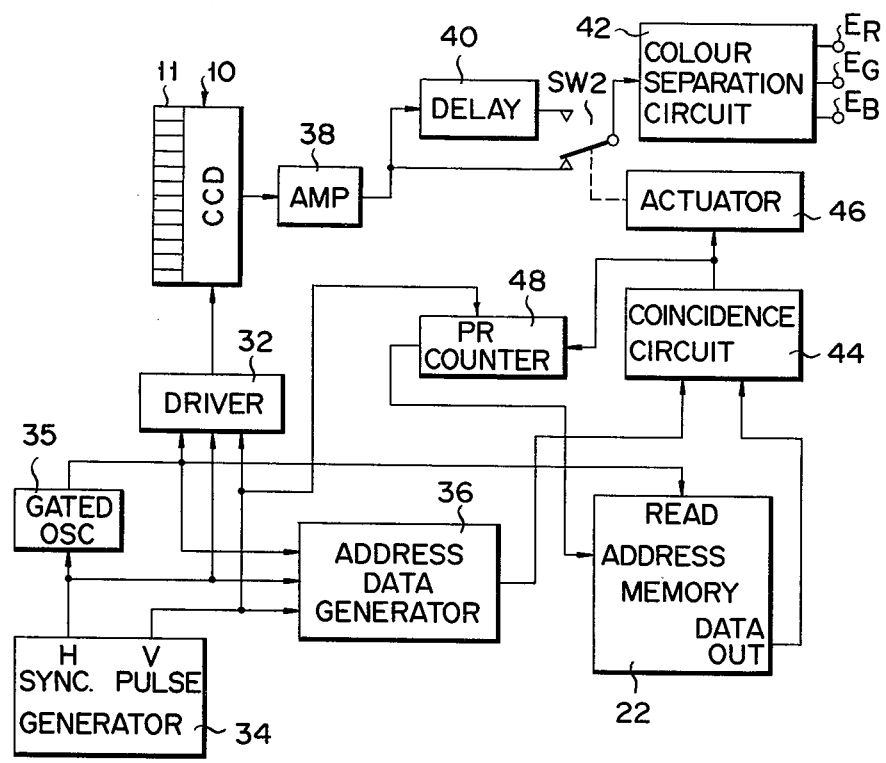
FIG. 3 shows a circuit diagram of another part of the blemish compensating system.

FIG. 3 shows a blemish compensating circuit for electronically compensating the blemish of the CCD 10 by using the memory 22 storing the blemish position information which is checked by the circuit in FIG. 1. In the circuit of FIG. 3, drive circuit 32, synchronizing pulse generator 34, gated oscillator 35, address data generator 36 and amplifier 38 are constructed like drive circuit 12, synchronizing pulse generator 14, gated oscillator 15, address data generator 26 and amplifier 18 shown in FIG. 1 and operate similarly. The output terminal of the amplifier 38 is coupled with the first contact of an analog switch SW2 and with the second contact of the switch SW2 via a delay circuit 40 providing one horizontal scanning time of delay. The movable contact of the analog switch SW2 is coupled with a color separation circuit 42. The color separation circuit 42 produces red, blue and green signals in accordance with an input signal.

The memory 22 receives at a read-out command input terminal a horizontal synchronizing pulse generated from the generator 34 through the gated oscillator 35 and produces stored data from the data output terminal thereof. The output data from the memory is supplied to one input terminal of a coincidence circuit 44 which receives at the other input terminal the address data from the address data oscillator 36. The coincidence circuit 44 produces an output signal when the address data from the address data generator 36 is coincident with the output data from the memory 22. The output signal from the coincident circuit 44 energizes a switch actuating circuit 46 so that the switch SW2 is set to connect the circuit 42 to the delay circuit 40. Further, the output signal from the coincident circuit 44 counts up at the trailing edge the counter 48 which is reset by the vertical synchronizing pulse from the synchronizing pulse generator 34. The output terminal of the counter 48 is coupled with the address designating terminal of the memory 22.

The operation of the blemish compensating circuit shown in FIG. 3 will be described. At the initial stage, the counter 48 is set by the leading edge, for example, of the vertical synchronizing pulse to count "1", and supplies the address data "1" to the address input terminal of the memory 22. Accordingly, the contents stored at the address 1 of the memory 22, that is the address data corresponding to the position (10,10), is applied to the coincident circuit 44.

As previously described, the image pick-up elements are successively energized by the driver circuit 32 and produces output signals in accordance with optical signals received at the light sensitive surface. The electric signal from CCD 10 is amplified by the amplifier 38 and then is applied to the color separation circuit 42 through the switch SW2 in a normal condition. Upon receipt of the electric signal, the circuit 42 produces red, green and blue signals. The address data corresponding to the position of the energized image pick-up element is supplied from the address data generator 36 to the coincidence circuit 44 where it is compared with the output data from the memory 22. When the image pick-up element at the position (10,10) is energized by the drive circuit 32, the address data generator 36 produces address data corresponding to the position (10,10). Upon this, the coincidence circuit 44 detects coincidence between the output data from the address data generator 36 and memory 22, and supplies an output signal to the actuator 46 during a time required for picture element scanning, and energizes the actuator 46 to set the switch SW2 to the second contact. The delay circuit 40 delays by one horizontal scanning time the output signal from CCD 10 so that the output signal from the image pick-up element at the position (10,9) is obtained from the delay circuit 40 and is supplied to the color separation circuit 42. That is, the output signal from the image pick-up element at the position (10,10) is shut off and the output signal from the image pick-up element at the position (10,9) is applied as the output signal from the image pick-up element at the position (10,10) to the color separation circuit 42. The output pulse of the coincidence circuit 44 counts up at the trailing edge the counter 48 by one count. As a result, the counter 48 produces count "2" signal so that the data stored at the address 2 of the memory 22, that is, data corresponding to the position (195,250), is produced from the memory. With further scanning of the image pick-up element, the element at the position (195,250) is energized. At this time, the output signal from the image pick-up element at the position (195,249) is applied as the output signal of the element at the position (195,250) to the color separation circuit 42 and the counter 48 is counted up.

When the image pick-up element at the position (85,320) is energized, the output signal from the element at the position (85,319) is similarly applied as the output signal of the element at the position (85,320) to the color separation circuit 42. Then, all the image pick-up elements are energized and when the element at the position (1,1) is again energized, the counter 48 is preset to have count "1" by the leading edge of the vertical synchronizing pulse.

The color stripe filter 11 used in FIG. 3 is comprised of a red transmitting region R, a green transmitting region G and a blue transmitting region B which are repeatedly arranged. Each color transmitting region is disposed corresponding to image pick-up elements disposed in series in a vertical direction. As described above, the output signal from the image pick-up element disposed right above the blemish image pick-up element is used as the output from the image pick-up element with blemish, as described above. Accordingly, the same optical signal as that of the right-above element is applied to the position on the screen corresponding to the blemish image pick-up element. Accordingly, an extremely different optical signal is not produced. In other words, a red spot, for example, does not appear in a clear blue sky.

Figure 4:
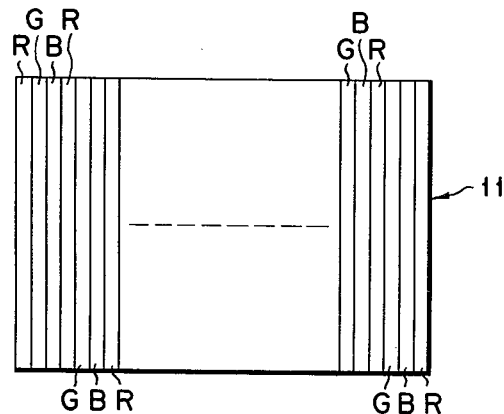
FIG. 4 shows a stripe color filter used in the circuits shown in FIGS. 1 and 3.
Figure 5:
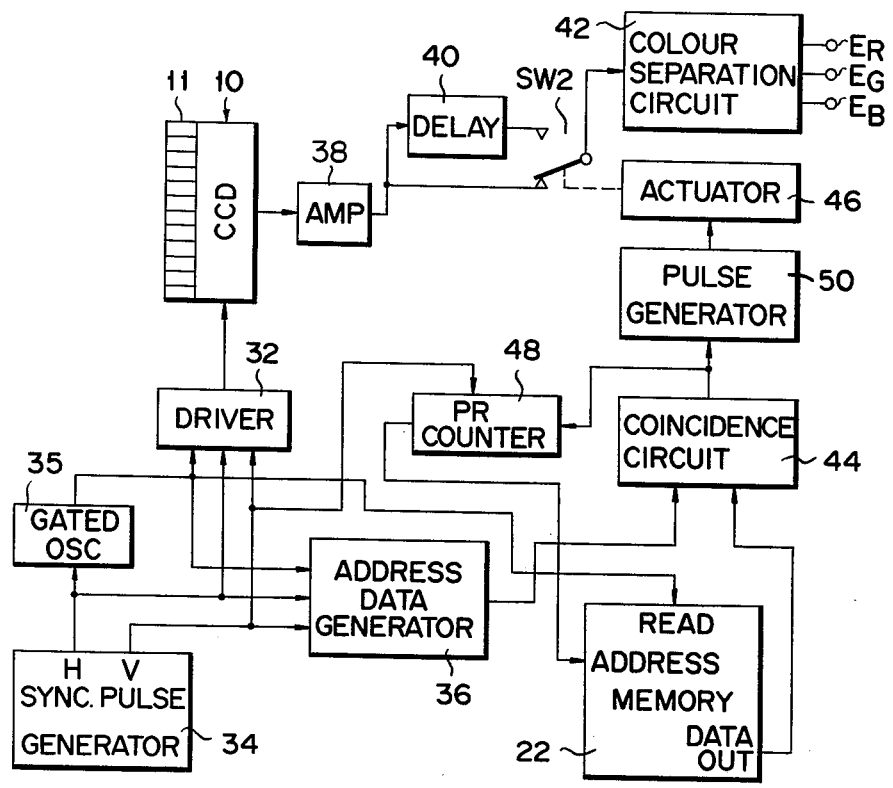
FIG. 5 shows a circuit diagram of a modification of the blemish compensating circuit shown in FIG. 3.
Figure 6:
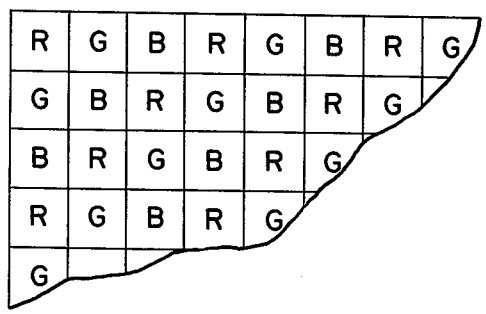
FIG. 6 shows a spot color filter which is usable in the circuits shown FIGS. 1, 3 and 5.

Turning now to FIG. 5, there is shown another example of the blemish compensating circuit. The only difference of the compensating circuit in FIG. 5 from that in FIG. 3 is the use of a pulse generator 50 which responds to the output pulse from the coincident circuit 44 to produce an output signal during a time required for scanning three picture elements and to energize the actuator 46 and then turn the switch SW2 to the second contact side. In this example, when a picture element in the red transmitting area is defective, used are the output signals from the picture elements right above the defective red picture element and the picture elements in the blue and green transmitting areas which are disposed on the right side of the defective one in FIG. 4, for the output signals from the defective one and the right side corresponding ones. Therefore, more harmonized optical signals may be obtained.

While the invention has been described referring to specific embodiments, the invention is not limited to the embodiment. For example, in the above embodiments shown in FIGS. 3 and 5, the output data from the defective picture elements is compensated by relating the defective element to the picture element right above the defective one. If the delay time of the delay circuit 40 is set equal to the time required for scanning three picture elements, the data from the defective elements may be corrected by the preceding three picture elements horizontally disposed in the same color transmitting areas.

Additionally, a low speed memory can be used for the blemish correcting system of the invention. Where, for example, there occurs a time delay corresponding to two picture elements in the overall system, data located at the position preceding by two picture elements to the blemish picture element is stored. For example, when the blemish picture element is located at the position (10,10), the data corresponding to the position (8,10) is stored in the memory.

In the case of FIG. 5, where it is required to effect compensation by using the output data from three picture elements right above the defective one and the picture elements disposed at both sides thereof, the address data corresponding to the position preceding by one picture element to the defective one is loaded into the memory. For example, when the defective element is located at (10,10), address data corresponding to the position (9,10) is stored in the memory 22.

The stripe color filter as shown in FIG. 4 may be replaced by a dot color filter. In this case, the delay time of the delay circuit 40 must be set at a value equal to (one horizontal scanning time—one picture element scanning time).

In the above-mentioned examples, switches SW1 and SW2 and the actuator 46 are used for simplicity but these may be replaced by the corresponding electronic parts.

Further, in the embodiments described, the image pick-up elements are energized one by one. (However, it is also possible to energize the pick-up elements arranged in a horizontal line at the same time and sequentially read out the energized pick-up elements.

What is claimed is:

1. A blemish compensating system used for a solid state image pick-up device having a plurality of image pick-up elements which are arranged to store electric charges corresponding to an optical image formed on the light sensitive portions thereof and are sequentially energized by a driving circuit in response to an output signal from a control signal generating means to derive out the electric charges stored on the respective image pick-up elements, comprising:

memory means for storing address data representing the position of a defective solid state image pick-up element or elements;

delay means for delaying the output signal from said image pick-up device by a time required for electrical signals to be taken out of those image pick-up elements of the image pick-up device which are horizontally arranged in a series;

comparing means for comparing the address data corresponding to the position of that image pick-up element which is energized by said driving circuit to produce an output signal with the address data read out from said memory means, in which, when both the data are coincident with each other as a result of the comparison, said comparing means produces an output signal; and switching means permitting the output signal of the solid state image pick-up device to pass therethrough in a first switching position, and responding to the output signal from said comparing means to be set to a second switching position, thereby permitting the output signal from the solid state image pick-up device to pass therethrough by way of said delay means.

2. A blemish compensating system according to claim 1, in which said memory means sequentially stores address data representing the position of defective solid state image pick-up elements and which further comprises address specifying means for sequentially specifying the address for said memory means in response to an output signal from said comparing means, thereby sequentially reading said address data out of said memory means.

3. A blemish compensating system according to claim 2, in which said address specifying means is formed of a counter for counting an output signal from said comparing means and supplying a count output signal as an address specifying signal to said memory means.

4. A blemish compensating system used for a solid state image pick-up device having a plurality of image pick-up elements which are arranged to store electric charges corresponding to an optical image formed on the light sensitive portions thereof and are sequentially energized by a driving circuit in response to an output signal from a control signal generating means to derive out the electric charges stored on the respective image pick-up element comprising:

memory means for storing address data representing the position of a defective solid state image pick-up element or elements;

delay means for delaying the output signal from said image pick-up device by the time differing from a time for taking electrical signals out of those image pick-up elements of the image pick-up device which are horizontally arranged in series by a time for taking an electric signal from a single image pick-up element;

comparing means for comparing the address data corresponding to the position of that image pick-up element which is energized by said driving circuit to produce an output signal with the address data read out from said memory means, in which, when both the data are coincident with each other as a result of the comparison, said comparing means produces an output signal; and switching means permitting the output signal of the solid state image pick-up device to pass therethrough in a first switching position, and responding to the output signal from said comparing means to be set to a second switching position, thereby permitting the output signal from the solid state image pick-up device to pass therethrough by way of said delay means.

5. A blemish compensating system according to claim 4, in which said memory means sequentially stores address data representing the position of defective solid state image pick-up elements and which further comprises address specifying means for sequentially specifying the address for said memory means in response to an output signal from said comparing means, thereby sequentially reading said address data out of said memory means.

6. A blemish compensating system used for a solid state image pick-up device having a plurality of image pick-up elements which are arranged to store electric charges corresponding to an optical image formed on the light sensitive portions thereof and are sequentially energized by a driving circuit in response to an output signal from a control signal generating means to derive out the electric charges stored on the respective image pick-up elements, comprising:

memory means for storing address data representing the position of a defective solid state image pick-up element or elements;

delay means for delaying an output signal from said solid state image pick-up device;

comparing means for comparing the address data corresponding to the position of that image pick-up element which is energized by said driving circuit to produce an output signal with the address data read out from said memory means, in which, when both the data are coincident with each other as a result of the comparison, said comparing means produces an output signal;

switching means permitting the output signal of the solid state image pick-up device to pass therethrough in a first switching position, and responding to the output signal from said comparing means to be set to a second switching position, thereby permitting the output signal from the solid state image pick-up device to pass therethrough by way of said delay means;

a data generating circuit producing an address data corresponding to the output signal of said control signal generating circuit to the input terminal of said memory means; and a comparing circuit for comparing the output signal of the image pick-up device with a first reference signal, in which, when the output signal of the image pick-up device is larger than the first reference signal, said comparing circuit produces an output signal to cause said memory means to be set in a write-in condition, whereby said comparing circuit sequentially writes address data from said address data generating circuit into said memory means.

7. A blemish compensating system used for a solid state image pick-up device having a plurality of image pick-up elements which are arranged to store electric charges corresponding to an optical image formed on the light sensitive portions thereof and are sequentially energized by a driving circuit in response to an output signal from a control signal generating means to derive out the electric charges stored on the respective image pick-up elements, comprising:

memory means for storing address data representing the position of a defective solid state image pick-up element or elements;

delay means for delaying an output signal from said solid state image pick-up device;

comparing means for comparing the address data corresponding to the position of that image pick-up element which is energized by said driving circuit to produce an output signal with the address data read out from said memory means, in which, when both the data are coincident with each other as a result of the comparison, said comparing means produces an output signal;

switching means permitting the output signal of the solid state image pick-up device to pass therethrough in a first switching position, and responding to the output signal from said comparing means to be set to a second switching position, thereby permitting the output signal from the solid state image pick-up device to pass therethrough by way of said delay means;

a data generating circuit producing an address data corresponding to the output signal of said control signal generating circuit to the input terminal of said memory means; and a comparing circuit for comparing the output signal of the image pick-up device with a first reference signal, in which, when the output signal of the image pick-up device is smaller than the first reference signal, said comparing circuit produces an output signal to cause said memory means to be set in a write-in condition, whereby said comparing circuit sequentially writes address data from said address data generating circuit into said memory means.

* * * * *